June 28, 1960 R. A. ZACHARY 2,943,317

AUTOMATIC GAIN CONTROL FOR MONOPULSE RADAR

Filed April 27, 1955 2 Sheets-Sheet 1

INVENTOR.
ROBERT A. ZACHARY
BY [signature]
H. H. [signature]
ATTORNEYS

INVENTOR.
ROBERT A. ZACHARY
BY H. H. Schmitt
H. H. Geninger
ATTORNEYS 2,943,317
Patented June 28, 1960

2,943,317

AUTOMATIC GAIN CONTROL FOR MONOPULSE RADAR

Robert A. Zachary, Utica, N.Y., assignor, by mesne assignments, to the United States of America as represented by the Secretary of the Navy Filed Apr. 27, 1955, Ser. No. 504,396

1 Claim. (Cl. 343—17.1)

This invention relates to automatic gain control circuitry for apparatus such as radar receivers and more particularly to gain control circuitry for tracking radars using simultaneous lobing from two or more antennas.

In radar tracking systems, it is desired to obtain the spatial coordinates of an aerial target. This information can be translated to azimuth, elevation, range and range rate and fed to suitable computers for use in gun aiming or displayed to the pilot of an aircraft in the case of airborne unit.

It has been found that if two identical paraboloidal antennas are mounted close together, one above the other in a vertical plane, the antenna patterns are superimposed both in a vertical and horizontal plane. Further, if the antennas are canted symmetrically in the horizontal plane an appropriate number of degrees, the patterns diverge symmetrically about the vertical plane of symmetry. Depending upon the position of the target in the antenna pattern, returns are received differing in phase or amplitude or both. The phase and amplitude differences represent all the information needed for obtaining the desired target spatial coordinates. Suitable detecting means are provided for detecting the sum of the two signals and the difference of the two signals when a target return is present. These sum and difference signals are then lead to two video amplifiers and from there to two mixers where they beat with a standard oscillator. Thus, two channels, a sum and a difference channel are present in the receiver and each has its own IF amplifier requiring an automatic gain control.

In the practical application of this type of system considerable difficulty is met in maintaining the amplification in the sum and difference IF amplifiers equal under all conditions of varying tube characteristics, temperature changes and signal level. The last item, change of signal level is extremely troublesome. In the devices heretofore used an automatic gain control loop is set up around the sum IF amplifier to maintain the output of a second detector in the sum channel constant. By means of a range gate the particular pulse being tracked is separated and a proportional D.C. voltage is fed back to the grids of several stages in the IF amplifier. This D.C. voltage increases or decreases the IF gain in such a way as to maintain constant the output of the IF strip for the particular pulse being tracked. The same automatic gain control voltage used for grid control in the sum IF amplifier is fed to the corresponding control grids in the difference IF amplifier.

Although the sum and difference IF amplifiers are identical, differences in $g_m$ control characteristics of vacuum tubes make it unlikely, if not impossible, that the sum and difference IF amplifiers have identical gain control curves. The result is that if the sum and difference IF amplifiers are adjusted to have equal gains for small signal levels, their gains become unequal at high signal levels. This results in unstable or weak servo response at those signals for which the receivers are unbalanced.

Therefore, it is an object of this invention to provide a means automatically insuring equal gains in a plurality of amplifiers forming a part of a multi-channel receiving system.

It is another object of this invention to provide a means for insuring equal gains in a plurality of amplifiers forming a part of a multi-channel receiving system, in spite of variation in signal level.

It is still another object of this invention to provide an automatic gain control for the amplifiers in a multi-channel radar receiver wherein the gain control is controlled by a pilot signal preceding a target return.

It is a further object of this invention to provide an automatic gain control for the amplifiers in a multi-channel radar receiver wherein a separate gain control loop is provided for the amplifier in each channel.

It is a still further object of this invention to provide an automatic gain control for the IF amplifiers of a multi-channel radar receiver in which a pilot signal is fed into each amplifier immediately preceding a target return and separate automatic gain control loops maintain the pilot signal constant.

A still further object of this invention is to provide an automatic gain control circuit for a multi-channel radar receiver which also functions as noise limiting circuit.

Other objects and many of the attendant advantages of this invention will be readily appreciated as the same becomes better understood by reference to the following detailed description when considered in connection with the accompanying drawings wherein.

Figure 1:
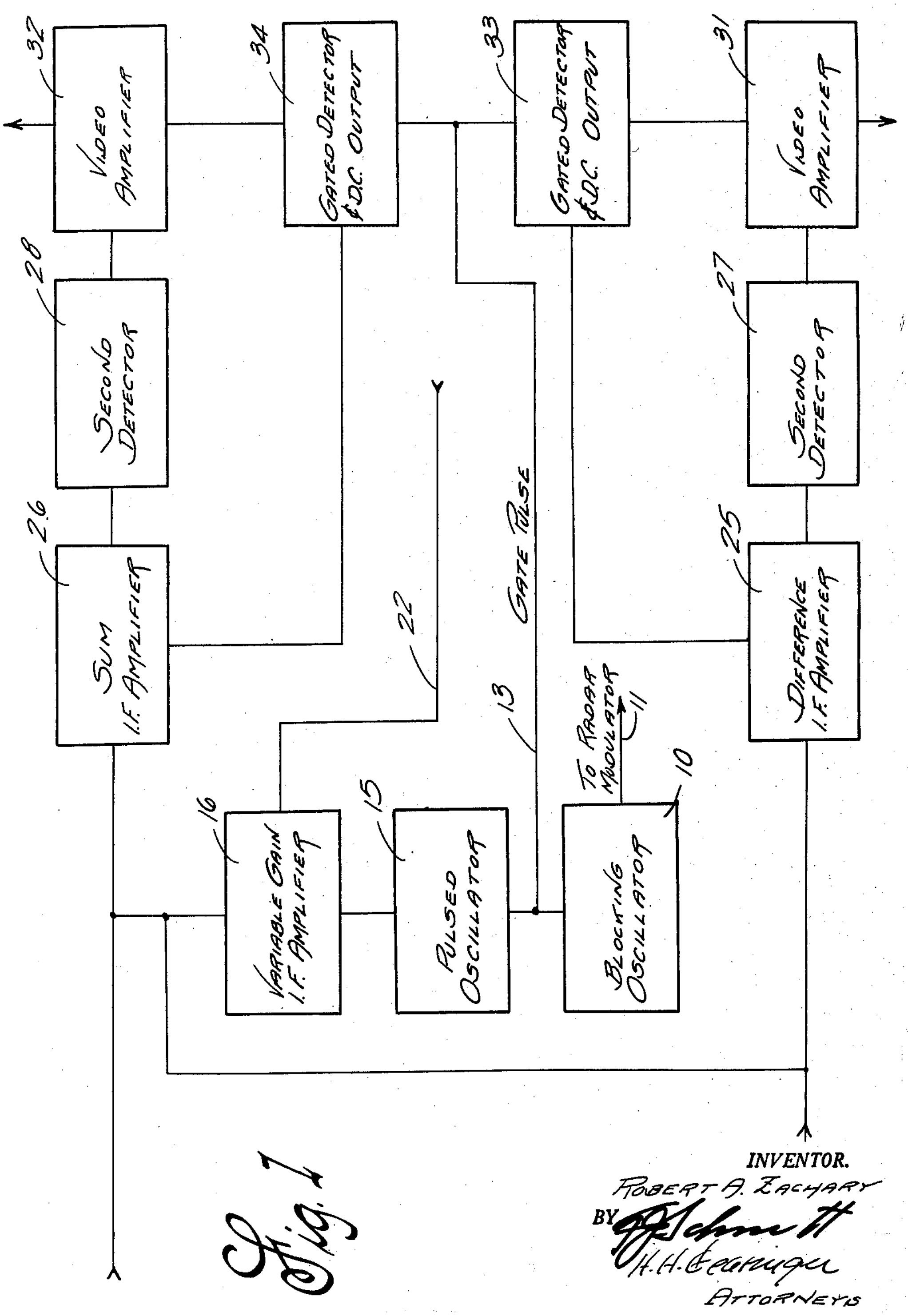
Figure 1 is a block diagram of the IF amplifying stage, second detecting, video amplifying stage and automatic gain control system embodying the invention.

Referring now to Figure 1 in which is shown a portion of a multi-channel receiver utilizing the automatic gain control system. The invention in the disclosed embodiment herein takes the form of a two channel system receiving the returns on a two antenna simultaneous lobing radar. It is to be understood however that the automatic gain control system has application in a 4 or other multi-antenna simultaneous lobing system and the following disclosure is by way of illustration only.

A radar receiver incorporating this invention comprises a wave guide means coupled to the pair of antennas (not shown) and a pair of first detecting means (not shown) to detect the sum of the two returns and the difference of the two returns. After amplification by suitable amplifiers (not shown) the sum and difference signals beat with a local oscillator (not shown) in a pair of balanced mixers (not shown).

The sum and difference signals are then fed to a sum IF amplifier 26 and a difference IF amplifier 25 whose gain it is desired to control automatically. This is accomplished generally by feeding a pilot signal consisting of a short pulse at IF frequency to the inputs of both the sum and difference IF amplifiers. This pilot signal is timed to precede the transmitted pulse of the radar by a short interval. Separate AGC loops set up around the sum and difference IF amplifiers function to maintain the pilot signal constant at the outputs of the two amplifiers. Gain control of the radar signal is accomplished by varying the input level of the pilot signal.

Blocking oscillator 10 generates a signal to initiate the action of a pulsed oscillator 15. This same signal is fed through a conductor 11 including a delay line 12 to the radar modulator so that the gain controlling pulse developed by the oscillator 15 precedes the transmitted radar pulse by a short time interval. The signal of the blocking oscillator 10 also is fed by conductor 13 to the gated detector where it functions to gate the detector in a manner to be described in greater detail hereinafter.

Figure 2:
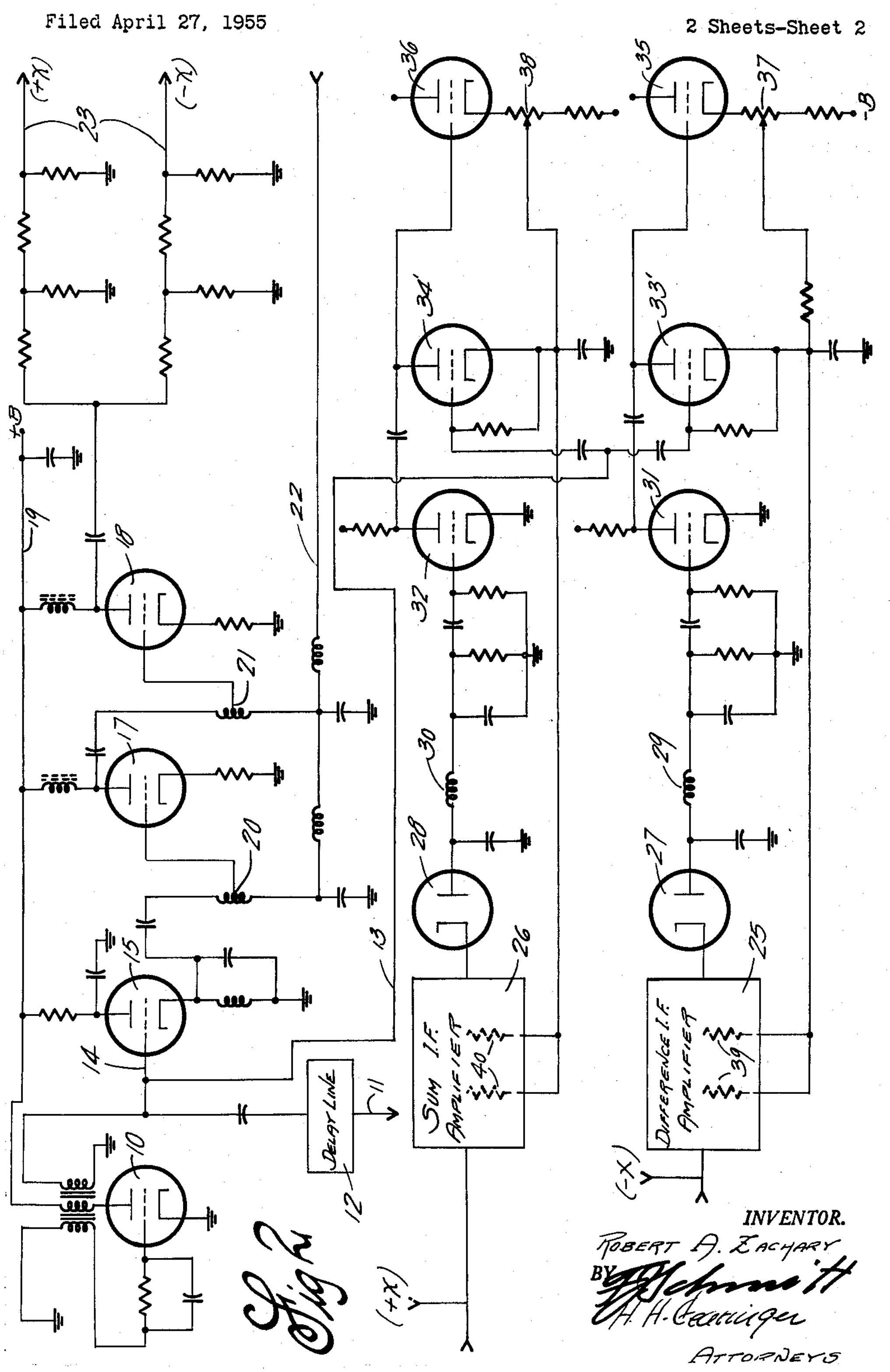
Figure 2 is a schematic diagram of the detecting, video amplifying and automatic gain control circuits embodying the invention.

The pilot signal developed by the pulsed oscillator, which is tuned to the intermediate frequency is fed to a variable gain amplifier 16 which in the form illustrated in Figure 2 is constituted by two amplifying stages 17 and 18 with a suitable plate supply 19 and a variable tap inductances 20 and 21, respectively whereby their gain may be varied. A conductor 22 from the radar feeds a positive automatic gain control voltage when the range gate locks on a radar echo thereby causing the pilot signal to increase.

The output of the amplifier 16 is divided between two resistive attenuation network 23 to the input terminals of the sum and difference IF amplifiers 26 and 25, respectively. This is necessary to provide isolation between these two terminals. After amplification by the amplifiers 25 and 26 the pilot signal or rather two pilot signals are detected by the second detector 27 and 28 and after passing through suitable filtering networks 29 and 30 are amplified by the video amplifiers 31 and 32.

The next stage comprises the gated detecting and D.C. output stages 33 and 34. The trigger generated by the blocking oscillator 10 is used to gate on the gated detector tubes 33′ and 34′, being fed to the grids thereof by the conductor 13. In practice the cathode of the detectors 33′ and 34′ are biased positively so that only signals arising above a threshold are detected. Each gated detector tube 33′ and 34′ is provided with a pair of cathode followers 35 and 36 which are connected between a suitable voltage source and the grids of which receive a positive D.C. signal from the plates of the detectors. The cathodes of each of the cathode followers are coupled through adjustable resistances 37 and 38 to the cathodes of the tubes 33′ and 34′. Thus, the output of tubes 33′ and 34′ being a positive D.C. voltage, the outputs of the cathode followers are similarly a positive D.C. and act to bias the cathodes of the detectors in the desired manner. The threshold is determined by the adjustment of the resistances 37 and 38. The detector tubes themselves are coupled as cathode followers having an output to the grids 39 and 40 of the amplifying tubes in the difference and sum IF amplifiers, respectively.

The threshold voltage of the detector cathodes is adjusted so that in the absence of any AGC voltage receiver noise is detected; thus the two auxiliary gain control loops function as automatic noise level controls which will hold receiver noise constant prior to radar lock-on.

The system operates in this manner: The oscillator 15 is being triggered by the blocking oscillator 10 which is also triggering the radar modulator through the delay line 12. The pilot signal output of the oscillator 15 therefore precedes the transmitted pulse of the radar by a short time interval. After amplification by variable amplifier 16 and attenuation by network 23, the pilot signals are fed to the input of the sum and difference IF amplifiers 26 and 25. After detection and filtering a negative D.C. signal is applied to the grid of each amplifier 31 and 32. The output of the amplifiers 31 and 32 is therefore a positive D.C. which is fed to the plates of the detectors 33′ and 34′ so that the output therefrom at the cathode is the negative D.C. for the grids of the IF amplifier.

Prior to the receiving of a radar echo the noise output of each channel is held constant by the action of the gated detector sampling the noise voltage appearing above the threshold. When the range gate locks on a radar echo, a positive AGC voltage proportional to the echo fed back to the pilot signal amplifier 16 by means of the conductor 22 increasing the grid bias thereof and causing the pilot signal to increase.

The auxiliary AGC loops around each IF amplifier accrodingly decrease the gain of the sum and difference IF amplifiers to hold the pilot signal constant at the level determined by the threshold. Since the pilot signal is fed to each IF amplifier at the same level, and since the auxiliary AGC loops hold the pilot signal outputs at the same level, the gains of the two channels remain equal. This is so, whether the received radar echo is equal to the noise or many times greater than the noise.

Thus, it is seen that the invention provides auxiliary AGC loops for multi-channel radar receivers which loops function as noise limiters and maintain the gains of a plurality of amplifiers equal regardless of signal level.

Obviously many modifications and variations of the present invention are possible in the light of the above teachings. It is therefore to be understood that within the scope of the appended claims the invention may be practiced otherwise than as specifically described.

What is claimed is:

An automatic gain control and noise limiter circuit for multi-channel pulse energy receivers comprising a source of pilot signals, means triggering said pilot signal source, delay line means coupling said triggering means to the modulator of a pulse energy transmitter, further means responsive to the level of a pulse received by the receiver controlling the level of said pilot signal, attenuation means coupling the output of said pilot signal level control means to an amplifier in each receiver channel, first detecting means receiving the output of each said amplifier, means for amplifying the output of each detecting means, grid controlled vacuum tubes having the plates thereof coupled to said last mentioned amplifying means, said triggering means being coupled to the grids of said tubes, means for controlling the cathode voltage of each said tube, said cathodes being biased positively whereby they will conduct only upon the simultaneous imposition of a signal at the plate and a trigger applied to the grid, said tubes being coupled as cathode followers to voltage control elements in said receiver amplifier whereby the gain of each receiver channel will be automatically controlled.

References Cited in the file of this patent

UNITED STATES PATENTS

| | | |
|---|---|---|
| 2,296,626 | Blumlein | Sept. 22, 1942 |
| 2,477,028 | Wilkie | July 26, 1949 |
| 2,784,400 | Ehrenfried | Mar. 5, 1957 |

FOREIGN PATENTS

| | | |
|---|---|---|
| 528,061 | Great Britain | Oct. 22, 1940 |
| 737,819 | Great Britain | Oct. 5, 1955 |